(12) United States Patent
Lee (10) Patent No.: US 9,316,795 B2
(45) Date of Patent: Apr. 19, 2016

(54) SELF-PROTECTING OPTICAL CONNECTOR (71) Applicant: HON HAI PRECISION INDUSTRY CO., LTD., New Taipei (TW)

(72) Inventor: Bing-Heng Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 324 days.

(21) Appl. No.: 13/921,003

(22) Filed: Jun. 18, 2013

(65) Prior Publication Data
US 2014/0148055 A1 May 29, 2014

(30) Foreign Application Priority Data

Nov. 29, 2012 (TW) .............................. 101144644 A (51) Int. Cl.
*G02B 6/38* (2006.01)
(52) U.S. Cl.
CPC ............ *G02B 6/3849* (2013.01); *G02B 6/3853* (2013.01)

(58) Field of Classification Search
None
See application file for complete search history.

(56) References Cited

U.S. PATENT DOCUMENTS 8,858,094 B2 * 10/2014 Weinrotter et al. ............. 385/88
9,057,847 B2 * 6/2015 Lin

* cited by examiner

*Primary Examiner* — John M Bedtelyon
(74) *Attorney, Agent, or Firm* — Novak Druce Connolly Bove + Quigg LLP (57) ABSTRACT

An optical connection includes a male connector and a female connector, the connector offers electrical connections in the manner and the size of a USB connector, together with an integral and uncouplable optical connection. The first optical connector is shielded by a first shielding member from damage and pollution at all times until the connection between the connectors is made and the second opposing optical connector enjoys the same protection. Coupling precision between the optical connectors is achieved by magnetism holding the optical connectors together.

12 Claims, 7 Drawing Sheets

SELF-PROTECTING OPTICAL CONNECTOR

BACKGROUND

1. Technical Field

The present disclosure relates to connectors and, particularly, to an optical connector.

2. Description of Related Art

Caps may be employed to cap a connecting end of optical connectors when the optical connectors are not used, to protect the connecting end from being contaminated. In use, the cap should be removed to expose the connecting end. Operations on the cap are not convenient. Furthermore, the cap is easily lost, which also adds to the inconvenience.

What is needed therefore is an optical connector addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Referring to FIGS. 1-5, an optical connector 100, according to an exemplary embodiment, is shown. The optical connector 100 includes a male connector 10 and female connector 20. The male connector 10 and the female connector 20 can be connected to each other to transmit optical signals therebetween.

The male connector 10 includes a plug 11, a connector holder 12, a first circuit board 13, a first block member 14, a first optical coupler 15, and a first shielding member 16. The first circuit board 13, the first block member 14, the first optical coupler 15, and the first shielding member 16 are received in the plug 11.

Figure 1:
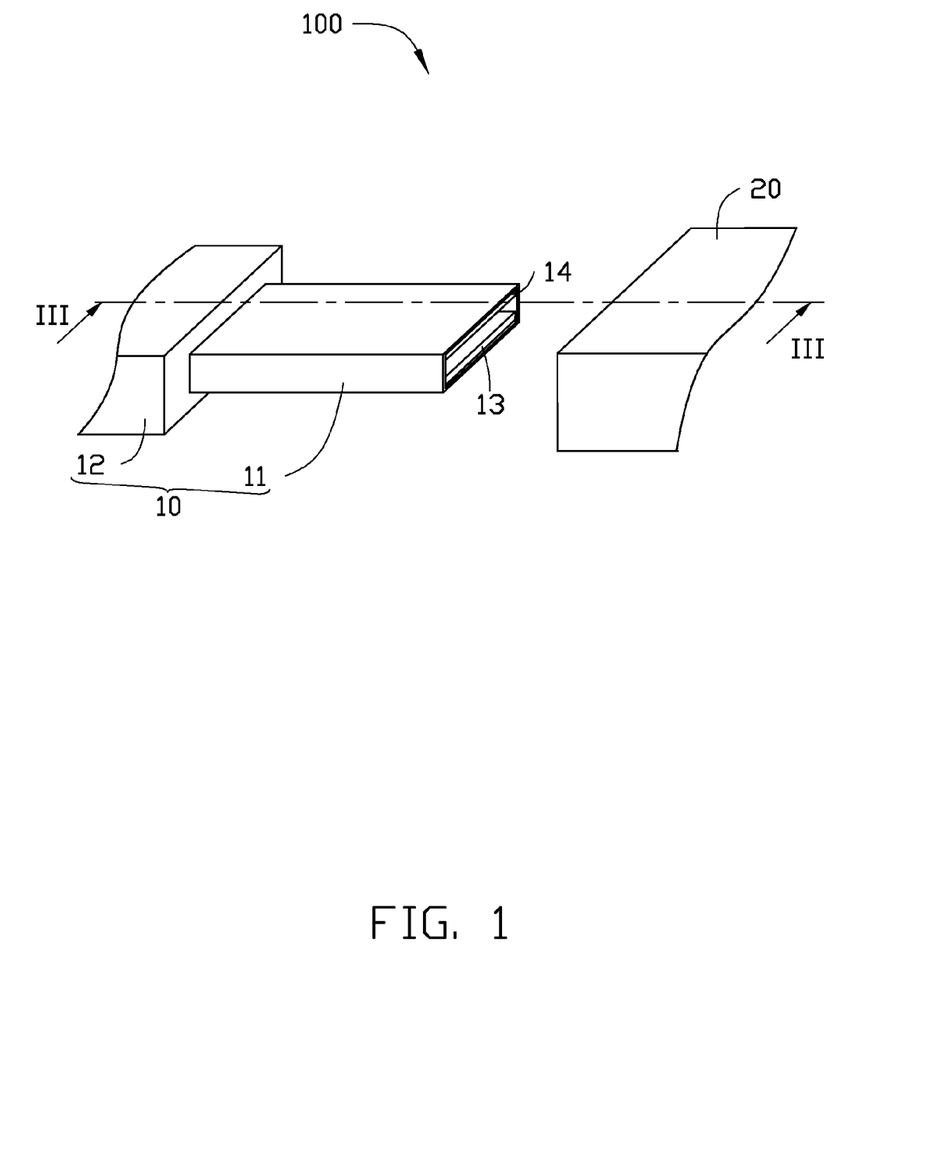
FIG. 1 is an isometric view of an optical connector, according to an exemplary embodiment of the present disclosure.
Figure 2:
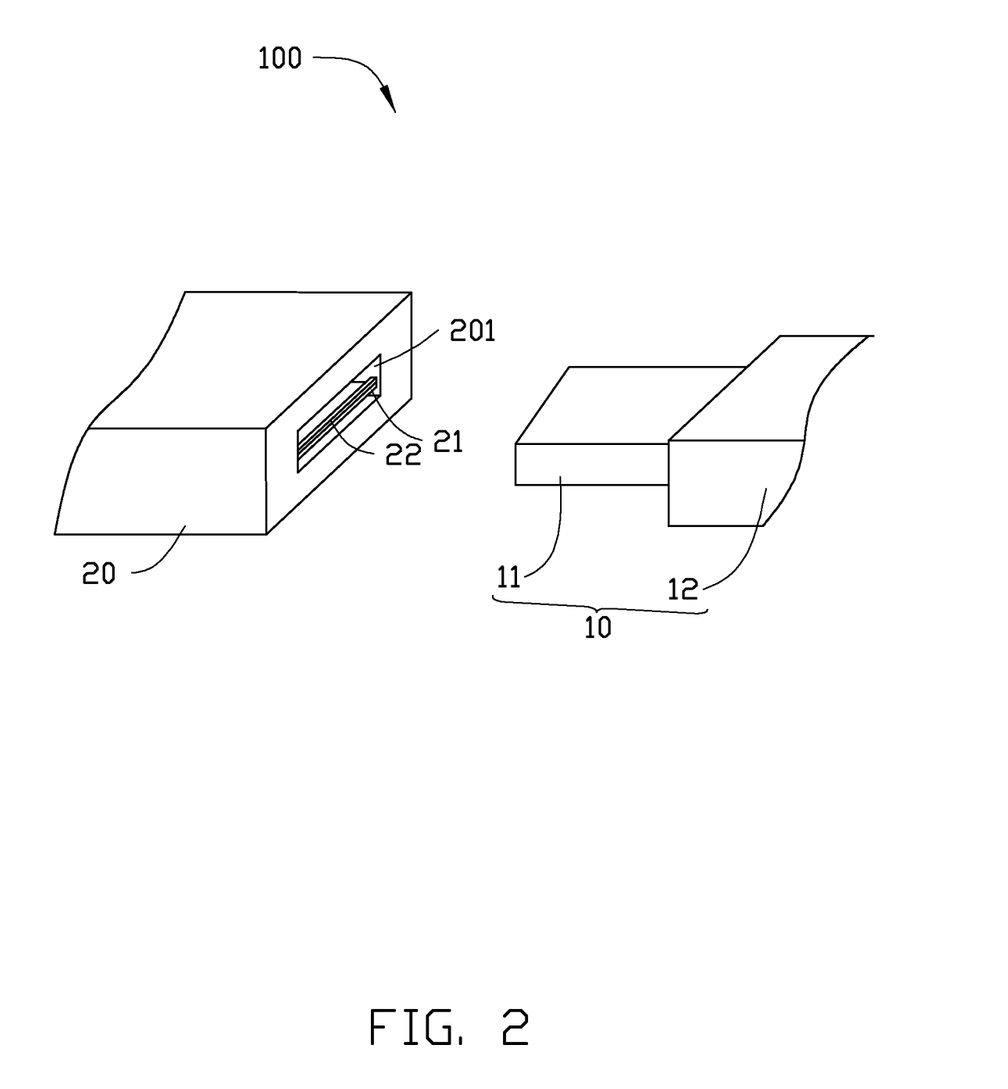
FIG. 2 is similar to FIG. 1, but shows the optical connector form another angle.
Figure 3:
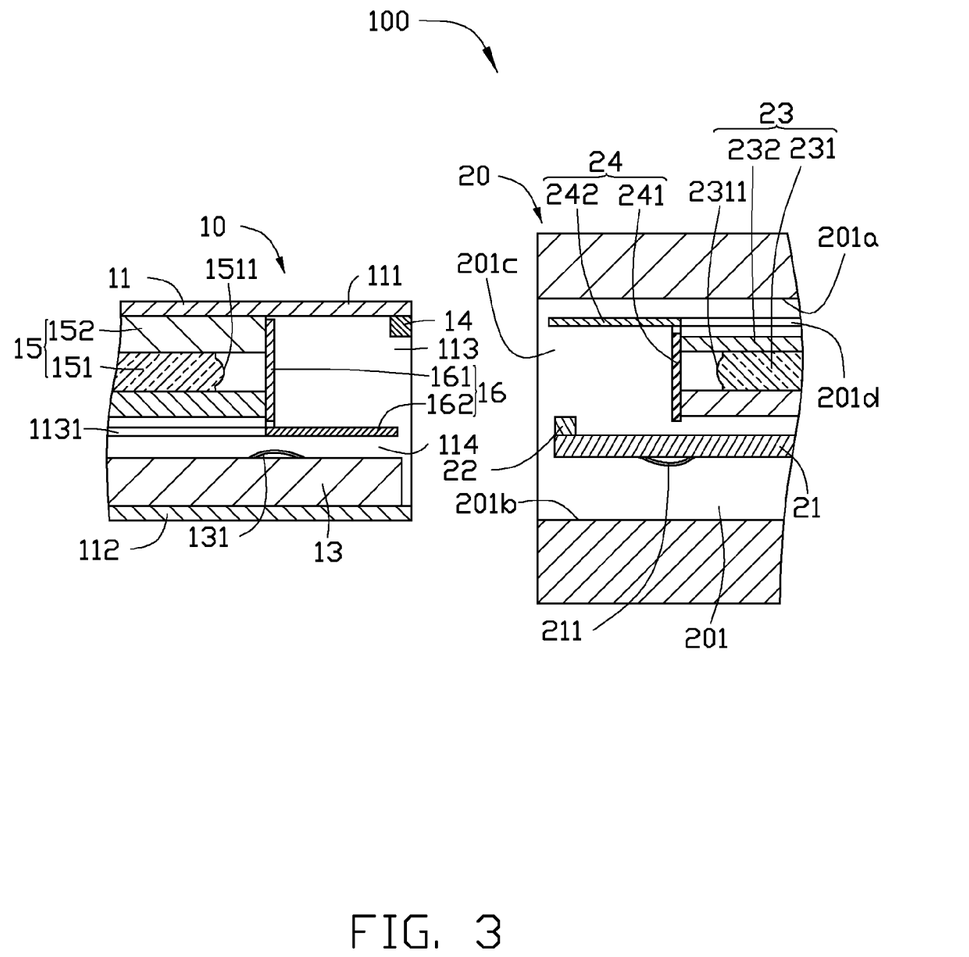
FIG. 3 is a sectional view of the optical connector of FIG. 1, taken along the line III-III, wherein the optical connector includes a first shielding member and a second shielding member.

The plug 11 includes a top plate 111, a bottom plate 112 opposite to the top plate 111, and two side plates 113 connected to the top plate 111 and the bottom plate 112. The top plate 111, the bottom plate 112 and the side plates 113 cooperatively define a receiving space 114 therebetween. The first circuit board 13, the first block member 14, the first optical coupler 15, and the first shielding member 16 are received in the receiving space 114 of the plug 11. Each side plate 113 defines a first guiding slit 1131. An elongated direction of each first guiding slit 1131 is substantially parallel to the bottom plate 112, and the first guiding slits 1131 of the side plates 113 have the same height relative to the bottom plate 112.

The first circuit board 13 is configured for electrically connecting the male connector 10 to the female connector 20. The first circuit board 13 is positioned on the bottom plate 112. The first circuit board 13 includes a number of first contacting sheets 131 formed on a surface away from the bottom plate 112. The first contacting sheets 131 serve as electrical contacts when the male connector 10 is connected to the female connector 20. The first contacting sheets 131 are made from a resilient and conductive material, thus the first contacting sheets 131 can be elastically compressed. In this embodiment, the first contacting sheets 131 are copper sheets.

The first block member 14 is positioned on an inner surface of the top plate 111 and is adjacent to an end of the plug 11 away from the connector holder 12. In this embodiment, the first block member 14 is elongated as a continuous bar. Alternatively, the first block member 14 can be comprised of a number of spaced blocks arranged along a direction substantially perpendicular to the side plates 113, also, the first block member 14 may include only one block. In this embodiment, the first block member 14 is made from a magnetic material.

The first optical coupler 15 is positioned in the plug 11 adjacent to the top plate 111. The first optical coupler 15 includes a lens portion 151 and a mounting portion 152 surrounding the lens portion 151. The lens portion 151 includes a number of converging portions 1511 protruding from an end away from the connector holder 12, the converging portions 1511 are configured for converging optical signals passing therethrough. The number of the converging portions 1511 can be changed according to the number of optical fibers (not shown) connected to the male connector 10, in this embodiment, the number of converging portions 1511 is four, and each converging portion 151 corresponds to an optical fiber. The mounting portion 152 is configured for fixing and positioning the lens portion 151 in the plug 11. In this embodiment, the mounting portion 152 is made from an elastic material, to absorb jars and impacts suffered by the male connector 10, therefore, the mounting portion 152 can protect the lens portion 151 from such impacts.

The first optical coupler 15 is spaced a predetermined distance D1 from the first circuit board 13, and the first guiding slits 1131 are in a space between the first optical coupler 15 and the first circuit board 13.

Figure 4:
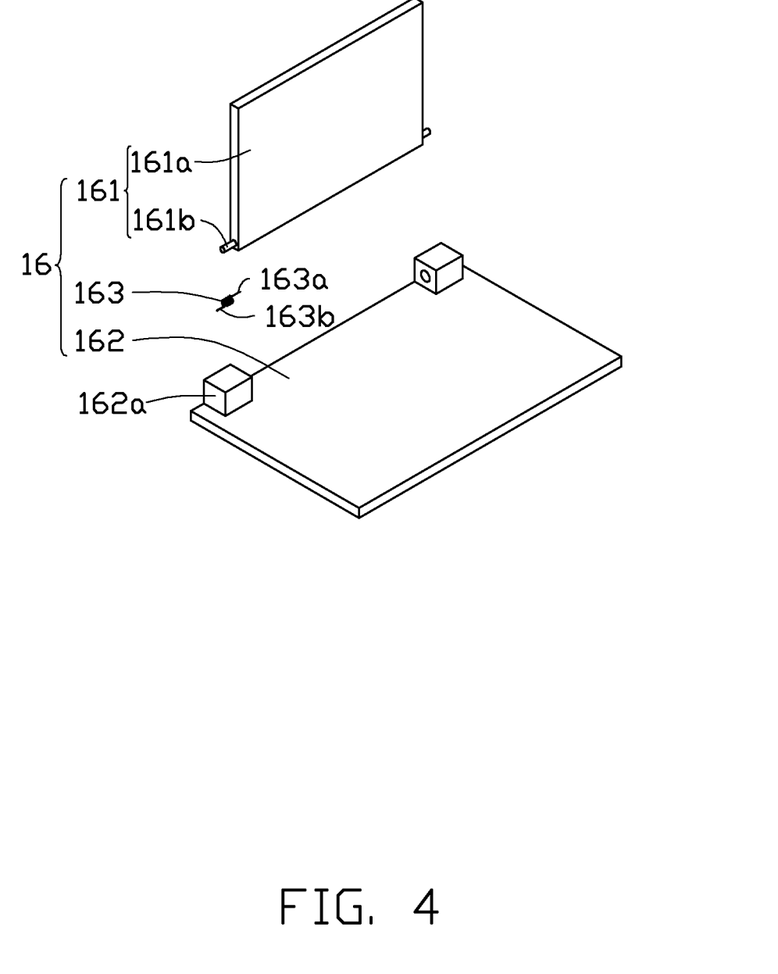
FIG. 4 is an exploded view of the first shielding member of FIG. 3.

The first shielding member 16 is positioned at an end of the first optical coupler 15 away from the connector holder 12. The first shielding member 16 includes a rotating portion 161, a sliding portion 162 pivotally connected to the rotating portion 161, and a restoring portion 163 positioned between the rotating portion 161 and the sliding portion 162. The rotating portion 161 includes a shielding plate 161a and two pivots 161b respectively protruding from two opposite sides of the shielding plate 161a. The shielding plate 161a is configured for shielding the first optical coupler 15 and keeping dust or other pollution from polluting the first optical coupler 15. The sliding portion 161 is slidably connected to the side plates 113, in detail, two opposite sides of the sliding portion 161 are slidably inserted into the first guiding slits 1131. The sliding portion 162 includes two pivot sleeves 162a corresponding to the pivots 161b. The pivot sleeves 162a are formed on a surface of the sliding portion 162 away from the bottom plate 112. Each pivot 161b is rotatably engaged with a pivot sleeve 162a. The sliding portion 162 is made from a material which is magnetic, in this embodiment, the sliding portion 162 is made from iron. The restoring portion 163 is configured for restoring the rotating portion 163. In this embodiment, the restoring portion 163 is a torsion spring, and the restoring portion 163 includes a first elastic leg 163a and a second elastic leg 163b. The restoring portion 163 sleeves on a pivot 161b, the first elastic leg 163a elastically resists the rotating portion 161, and the second elastic leg 163b elastically resists the sliding portion 162. When the restoring portion 163 is in released state, the rotating portion 161 is substantially perpendicular to the sliding portion 162 and covers an end of the first optical coupler 15 away from the connector holder 12. Alternatively, a similar rotating portion can be mounted on the other pivot 161b.

The female connector 20 defines a socket 201 corresponding to the plug 11. The socket 201 includes a top surface 201a, a bottom surface 201b opposite to the top surface 201a, and two side surfaces 201c connected to the top surface 201a and the bottom surface 201b. Each side surface 201c defines a second guiding slit 201d. An elongated direction of each second guiding slit 201d is substantially parallel to the top surface 201a, and the second guiding slits 201d have the same height relative to the top surface 201a. The female connector 20 includes a second circuit board 21 corresponding to the first circuit board 13, a second block member 22, a second optical coupler 23 corresponding to the first optical coupler 15, and a second shielding member 24. The second circuit board 21, the second block member 22, the second optical coupler 23 and the second shielding member 24 are all received in the socket 201.

The second circuit board 21 is configured for electrically connecting the female connector 20 to the male connector 10. The second circuit board 21 is positioned adjacent to the bottom surface 201b and spaced a predetermined distance D2 from the bottom surface 201b. The distance D2 is larger than a sum of a thickness of the bottom plate 112 and a thickness of the first circuit board 13. The second block member 22 includes a number of second contacting sheets 211 formed on a surface facing toward the bottom surface 201b. Each second contacting sheet 211 corresponds to the first contacting sheet 131. The second contacting sheets 211 serve as electrical contacts when the male connector 10 is connected to the female connector 20, in detail, when the male connector 10 and the female connector 20 are connected to each other, each second contacting sheet 211 is in contact with a corresponding first contacting sheet 131. The second contacting sheets 211 are made from a material similar to that of the first contacting sheets 131.

The second block member 22 is positioned on a surface of the second circuit board 21 away from the bottom surface 201b and is adjacent to a distal end of the second circuit board 21. The second block member 22 has a similar structure and material to that of the first block member 14.

The second optical coupler 23 is positioned between the second circuit board 21 and the top surface 201a of the socket 201, and the second optical coupler 23 is spaced a predetermined distance D3 from the top surface 201a. The second guiding slits 201d are in a space between the second circuit board 21 and the top surface 201a of the socket 201. Similar to the first optical coupler 15, the second optical coupler 23 includes a lens portion 231 and a mounting portion 232 surrounding the lens portion 231, and the lens portion 231 includes a number of converging portions 2311.

Figure 5:
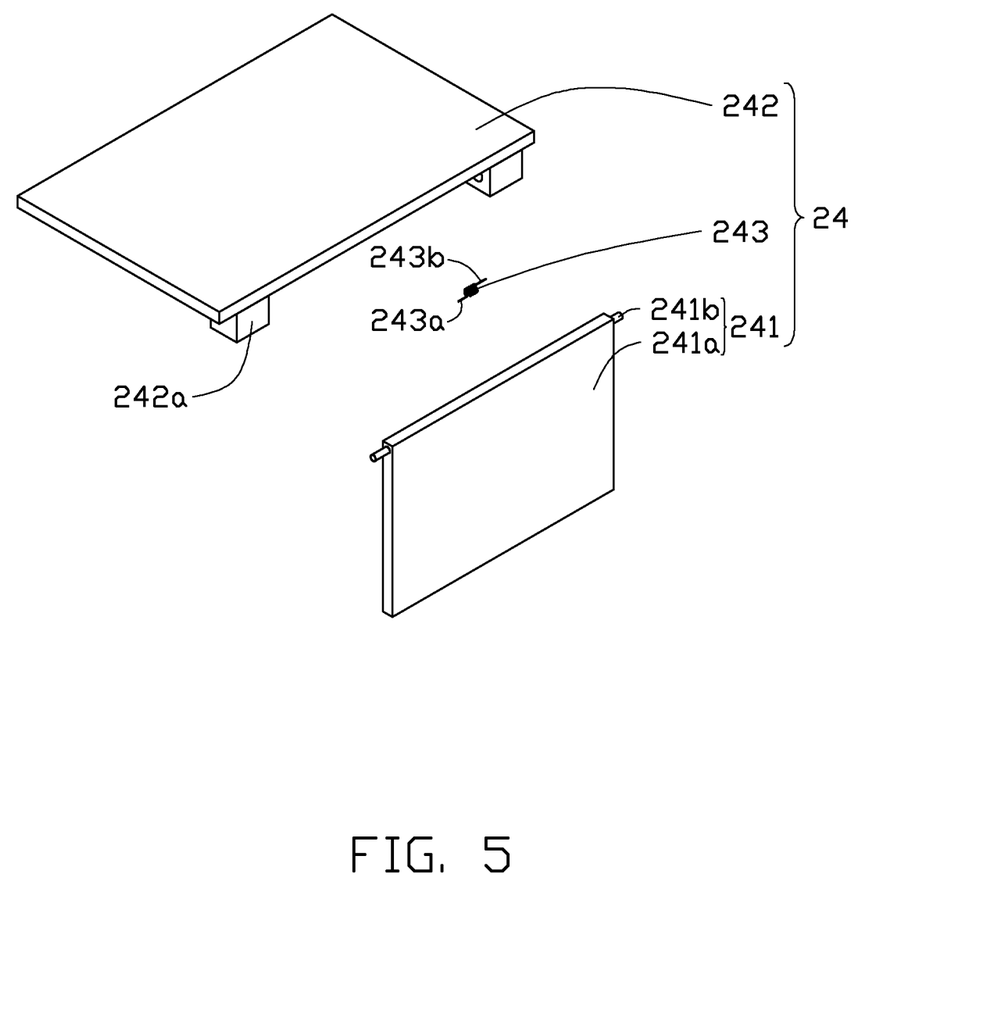
FIG. 5 is an exploded view of the second shielding member of FIG. 3.

The second shielding member 24 is positioned at an end of the second optical coupler 23 facing toward an opening of the socket 201. Similar to the first shielding member 16, the second shielding member 24 includes a rotating portion 241, a sliding portion 242 pivotally connected to the rotating portion 241, and a restoring portion 243 positioned between the rotating portion 241 and the sliding portion 242. The rotating portion 241 includes a shielding plate 241a and two pivots 241b respectively protruding from two opposite sides of the shielding plate 241a. Two opposite sides of the sliding portion 241 are slidably inserted into the second guiding slits 201d. The sliding portion 242 includes two pivot sleeves 242a corresponding to the pivots 241b.

Each pivot 241b is rotatably engaged with a corresponding pivot sleeve 242a. The sliding portion 242 is made from magnetic material. The restoring portion 243 includes a first elastic leg 243a and a second elastic leg 243b. The restoring portion 243 sleeves on a pivot 241b, the first elastic leg 243a elastically resists the rotating portion 241, and the second elastic leg 243b elastically resists the sliding portion 242. When the restoring portion 243 is in released state, the rotating portion 241 is substantially perpendicular to the sliding portion 242 and covers an end of the second optical coupler 23 facing toward the opening of the socket 201.

Figure 6:
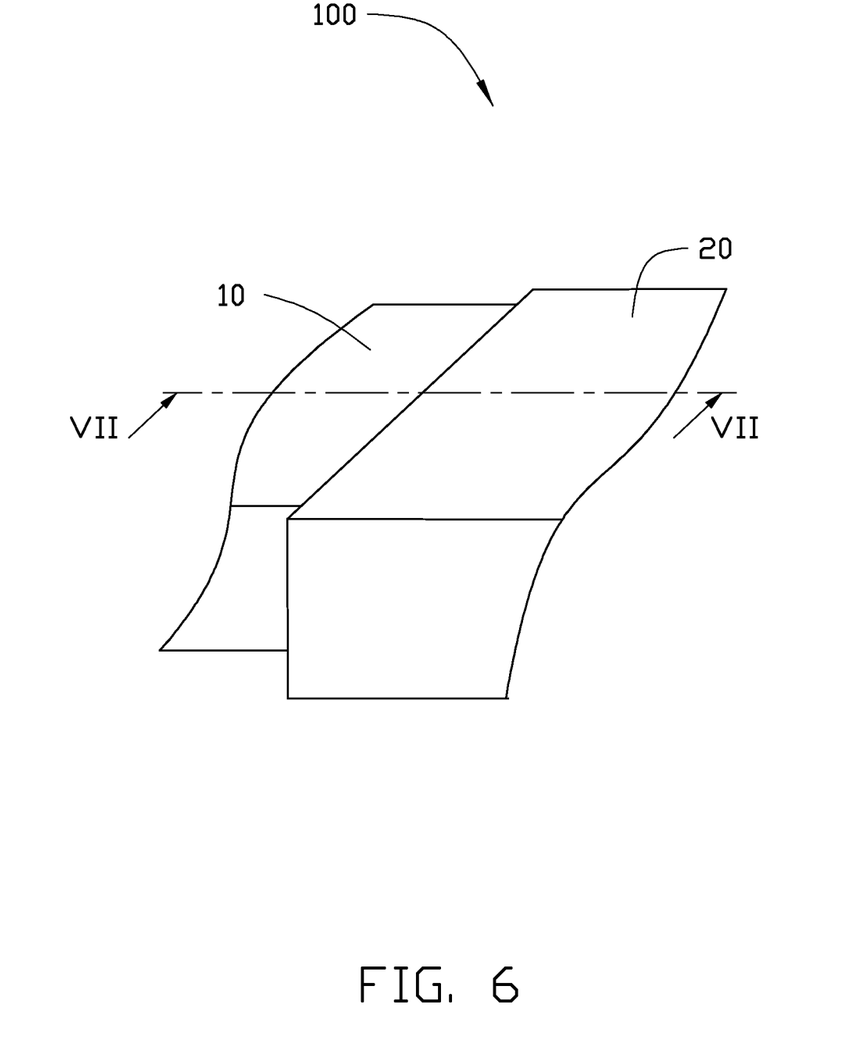
FIG. 6 is an assembled view of the optical connector of FIG. 1.
Figure 7:
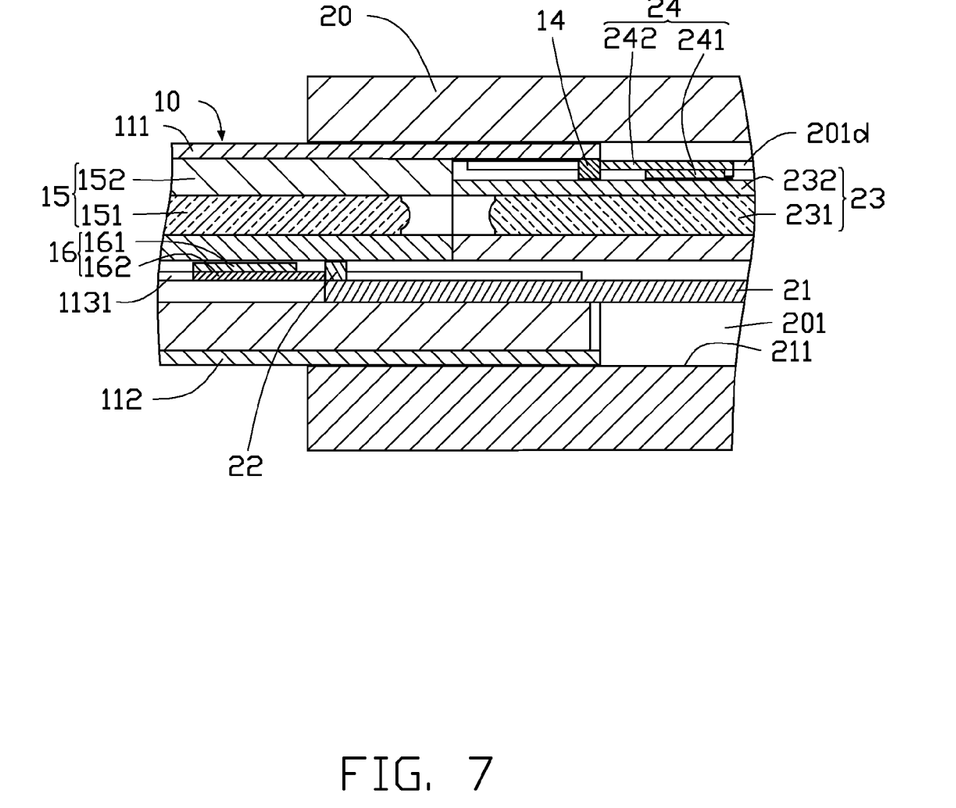
FIG. 7 is a sectional view of the optical connector of FIG. 6, taken along the line VII-VII.

Referring to FIGS. 6 and 7, when the male connector 10 and the female connector 20 are to be connected, the plug 11 is inserted into the socket 201, the first block member 14 makes contact with the sliding portion 242 of the second shielding member, and the second block member 22 makes contact with the sliding portion 162 of the first shielding member 16. Because the first block member 14 and the second block member 22 are made from a magnetic material, and the sliding portions 162, 242 of the first shielding member 16 and the second shielding member 24 are also magnetic, therefore, the first block member 14 and the sliding portion 242 adhere to each other by a magnetic force therebetween, and the second block member 24 and the sliding portion 162 adhere to each other by a magnetic force therebetween.

During the insertion of the plug 11, the first block member 14 pushes the sliding portion 242 of the second shielding member 24 to slide along the second guiding slits 201d, and the second block member 24 pushes the sliding portion 162 of the first shielding member 16 to slide along the first guiding slits 1131. During the sliding of the sliding portions 162, 242, the mounting portion 232 of the second optical coupler 23 pushes the rotating portion 161 of the first shielding member 16 to rotate relative to the sliding portion 162, and the mounting portion 152 of the first optical coupler 15 pushes the rotating portion 241 of the second shielding member 24 to rotate relative to the sliding portion 242. When the sliding portions 162, 242 have slid a predetermined distance, the rotating portion 161 overlaps on the sliding portion 162, and the rotating portion 241 overlaps on the sliding portion 242. The overlapped rotating portion 161 and sliding portion 162 are received in a space between the first circuit board 13 and the first optical coupler 15, and the overlapped rotating portion 241 and sliding portion 242 are received in a space between the second optical coupler 23 and the bottom surface 201a of the socket 201. The restoring members 163, 243 are compressed during the insertion of the plug 11. When the plug 11 has been inserted into the socket 201a predetermined distance, the converging portions 1511 of the first optical coupler 15 are optically aligned with the converging portion 2311 of the second optical coupler 23, and the first contacting sheets 131 are in contact with the second contacting sheet 211.

When the male connector 10 is to be detached from the female connector 20, the connector holder 12 of the male connector 10 is pulled. During retraction of the plug 10, the first block member 14 drags the sliding portion 242 of the second shielding member 24 to move with the plug 11 along the second guiding slits 201d, and the second block member 22 drags the sliding portion 162 of the first shielding member 16 to slide along the first guiding slits 1131. When the sliding portions 162 slide to ends of the first guiding slits 1131, the rotating portion 161 rotates relative to the sliding portion 162 and covers an end of the first optical coupler 15 under a force of the restoring member 163. When the sliding portions 242 slide to ends of the second guiding slits 201d, the rotating portion 241 rotates relative to the sliding portion 242 and covers an end of the second optical coupler 23 under a force of the restoring member 243. Therefore, the first shielding member 16 and the second shielding member 24 can conveniently protect the optical connector 100 from being polluted or impacted when the male connector 10 and the female connector 20 are detached from each other.

In this embodiment, the first block member 14 and the second block member 22 are made from a magnetic material, and the sliding portions 162, 242 of the first shielding member 16 and the second shielding member 24 are made from magnetic material. Alternatively, the first block member 14 and the second block member 22 can be made from magnetic material, and the sliding portions 162, 242 of the first shielding member 16 and the second shielding member 24 can be made from a magnetic material. Also, all of the first block member 14, the second block member 22 and the sliding portions 162, 242 can be made from magnetic material, on condition that the first block member 14 and the sliding portion 242 can adhere to each other by a magnetic force therebetween, and the second block member 22 and the sliding portion 162 can adhere to each other by a magnetic force therebetween.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical connector, comprising:
    a male connector, comprising:
        a plug defining a receiving space therein;
        a first optical coupler received in the receiving space;
        a first block member positioned on the plug; and
        a first shielding member received in the receiving space and shielding the first optical coupler; and
    a female connector defining a socket corresponding to the plug, the female connector comprising:
        a second optical coupler received in the socket;
        a second block member positioned in the socket; and
        a second shielding member received in the socket and shielding the second optical coupler;
        wherein each of the first shielding member and the second shielding member comprises a sliding portion and a rotating portion rotatably connected to the sliding portion, the rotating portion of the first shielding member shields or exposes the first optical coupler via a rotation relative to the shielding portion of the first shielding portion, and the rotating portion of the second shielding member shields or exposes the second optical coupler via a rotation relative to the shielding portion of the second shielding portion; and
    wherein the first block member pushes the second shielding member to expose the second optical coupler to the male connector, and the second block member pushes the first shielding member to expose the first optical coupler to the female connector during a connection of the male connector and the female connector.

2. The optical connector of claim 1, wherein the plug comprises a top plate, a bottom plate opposite to the top plate, and two side plates connected to the top plate and the bottom plate, the top plate, the bottom plate and the side plates cooperatively define the receiving space therebetween.

3. The optical connector of claim 2, wherein each side plate defines a first guiding slit in an inner surface thereof, the first guiding slit is substantially parallel to the bottom plate, and two opposite sides of the sliding portion of the first shielding portion are slidably inserted into the first guiding slits, respectively.

4. The optical connector of claim 3, wherein the first optical coupler is spaced a predetermined distance from the bottom plate, the first guiding slit is positioned in a space between the first optical coupler and the bottom plate, and the distance between the first optical coupler and the bottom plate is larger than a sum of thicknesses of the sliding portion and rotating portion of the first shielding portion.

5. The optical connector of claim 1, wherein the socket comprises a top surface, a bottom surface opposite to the top surface, and two side surfaces connected to the top surface and the bottom surface.

6. The optical connector of claim 5, wherein each side surface defines a second guiding slit therein, the second guiding slit is substantially parallel to the top surface, and two opposite sides of the sliding portion of the second shielding portion are slidably inserted into the second guiding slits, respectively.

7. The optical connector of claim 6, wherein the second optical coupler is spaced a predetermined distance from the top surface, the second guiding slit is positioned in a space between the second optical coupler and the top surface, and the distance between the second optical coupler and the top surface is larger than a sum of thicknesses of the sliding portion and rotating portion of the second shielding portion.

8. The optical connector of claim 1, wherein the first block member and the second block member are made from a magnetic material, and the sliding portions of the first shielding member and the second shielding member are made from a material which can be attracted by a magnet.

9. The optical connector of claim 1, wherein each of the first shielding member and the second shielding member comprises a restoring member, the restoring member of the first shielding member is configured for restoring the rotating portion of the first shielding member, and the restoring member of the second shielding member is configured for restoring the rotating portion of the second shielding member.

10. The optical connector of claim 1, wherein the male connector comprises a first circuit board received the receiving space, the female connector comprises a second circuit board received in the socket, and the first circuit board and the second circuit board are electrically connected to each other when the male connector and the female connector are connected to each other.

11. The optical connector of claim 10, wherein the first circuit board comprises a plurality of first contacting sheets, the second circuit board comprises a plurality of second contacting sheet corresponding to the first contacting sheets, the first circuit board and the second circuit board are electrically connected to each other via the first and second contacting sheet.

12. The optical connector of claim 10, the first block member is positioned on end of the plug facing toward the female connector, and the second block is positioned on an end of the second circuit board facing toward the male connector.

* * * * *